United States Patent
Uehara

(10) Patent No.: US 10,619,706 B2
(45) Date of Patent: Apr. 14, 2020

(54) SPEED REDUCER AND MOTOR WITH SPEED REDUCER

(71) Applicant: SHINANO KENSHI KABUSHIKI KAISHA, Nagano (JP)

(72) Inventor: Hiroshi Uehara, Nagano (JP)

(73) Assignee: SHINANO KENSHI KABUSHIKI KAISHA, Nagano (JP)

(*) Notice: Subject to any disclaimer, the term of this patent is extended or adjusted under 35 U.S.C. 154(b) by 99 days.

(21) Appl. No.: 16/020,143

(22) Filed: Jun. 27, 2018

(65) Prior Publication Data

US 2019/0056012 A1 Feb. 21, 2019

(30) Foreign Application Priority Data

Aug. 21, 2017 (JP) .................................. 2017-158644
May 28, 2018 (JP) .................................. 2018-101807

(51) Int. Cl.
*F16H 1/32* (2006.01)
*H02K 7/075* (2006.01)

(52) U.S. Cl.
CPC ............... *F16H 1/32* (2013.01); *H02K 7/075* (2013.01); *F16H 2001/323* (2013.01); *F16H 2001/325* (2013.01); *H02K 2213/03* (2013.01)

(58) Field of Classification Search
CPC ................ F16H 1/32; F16H 2001/325; F16H 2001/328; F16H 2001/327; F16H 57/023; F16H 2001/323; H02K 7/075; H02K 2213/03; H02K 7/116; H02K 7/85
USPC .......................................... 475/177, 178, 179
See application file for complete search history.

(56) References Cited

U.S. PATENT DOCUMENTS

| 5,286,237 A * | 2/1994 | Minegishi ................. F16H 1/32 475/178 |
| 2002/0111243 A1* | 8/2002 | Minegishi ................. F16H 1/32 475/178 |
| 2006/0040779 A1* | 2/2006 | Tsurumi ..................... F16H 1/32 475/183 |
| 2013/0225354 A1* | 8/2013 | Katoh ....................... F16H 1/32 475/178 |
| 2015/0005130 A1* | 1/2015 | Yamamoto ............... B60K 7/00 475/149 |
| 2015/0219187 A1 | 8/2015 | Saito et al. |
| 2018/0031079 A1* | 2/2018 | Yoshida .................... F16H 1/32 |

FOREIGN PATENT DOCUMENTS

JP 2017044319 3/2017

* cited by examiner

*Primary Examiner* — Roger L Pang
(74) *Attorney, Agent, or Firm* — Stephen J. Weyer, Esq.; Stites & Harbison, PLLC

(57) ABSTRACT

To provide an inexpensive and thin motor with a speed reducer capable of elongating lifetime of bearings by reducing the effect of internal moments acting on an output member without using expensive bearings. A motor with a speed reducer performing output with a gear mechanism rotating to reduce speed around an electric motor M and an eccentric shaft driven to rotate by the electric motor M, in which a plurality of external gears are respectively assembled to the eccentric shaft at positions where moments obtained by multiplying distances in an axial direction from a position of a bearing provided in a speed reducer housing by magnitudes of loads acting on output pins at the positions are cancelled out with each other.

6 Claims, 6 Drawing Sheets

CROSS SECTION A-A

X-X CROSS SECTION

| | a [mm] | ta [mm] | tb [mm] | b [mm] | fa [N] | fb [N] | MOMENT fa*a [Nmm] | fb*b [Nmm] | RESIDUAL [Nmm] | h [mm] |
|---|---|---|---|---|---|---|---|---|---|---|
| EXAMPLE 1 | 8 | 3 | 3 | 12 | 180 | 120 | 1440 | 1440 | 0 | 1 |
| EXAMPLE 2 | 5.25 | 3.5 | 2.3 | 12.3 | 210 | 90 | 1102.5 | 1102.5 | 0 | 4.1 |

SECTION A-B-C-D-E-F-G-H

SPEED REDUCER AND MOTOR WITH SPEED REDUCER

CROSS-REFERENCE TO RELATED APPLICATION

This application is based upon and claims the benefit of priority of the prior Japanese Patent Application Nos. 2017-158644, filed on Aug. 21, 2017, and 2018-101807, filed on May 28, 2018, and the entire contents of which are incorporated herein by reference.

TECHNICAL FIELD

The present invention relates to a speed reducer driven in, for example, a trochoid speed reduction system and a motor with the speed reducer.

BACKGROUND ART

The speed reducer operating in the trochoid speed reduction system includes a ring-shaped internal gear attached to a housing, a disc-shaped external gear a pitch diameter of which is set to be smaller than the that of the internal gear and which is arranged inside the internal gear and an output member linked to the external gear and outputting rotation movement of the external gear to the outside. The external gear performs revolution movement (oscillatory movement) at a given number of revolutions (revolution speed) while internal teeth and external teeth are meshed with each other by actuation from an electric motor inside the internal gear attached to the housing. Along with the revolution movement (oscillatory movement), the external gear performs rotation movement at a number of rotations (rotation speed) reduced lower than the revolution speed by meshing with the internal gear. Then, the reduced rotation movement of the external gear is transmitted to the output member, and a reduced rotation output is outputted from the output member.

For example, a speed reducer disclosed in FIG. 5 of PTL 1 (JP-A-2014-81068) includes a bar-shaped input shaft in which a rotor is attached to a tip portion and which rotates by rotation input from an electric motor, a ring-shaped internal gear attached to a housing, a ring-shaped external gear meshed with the internal gear and rotating around the input shaft and plural output pins provided between the external gear and an approximately disc-shaped output member.

The external gear is arranged in a state that part of outer teeth is meshed with inner teeth of a first internal gear inside the internal gear. Then, when the motor is activated and the input shaft rotates, the external gear performs revolution movement (oscillatory movement) in the internal gear at an input speed inputted from the motor as well as performs rotation movement at a rotation speed reduced with respect to the revolution movement at a given rate. Then, the rotation movement is transmitted to the output member through the output pins and the output member rotates around the input shaft rotating with the external gear (see PTL 1: JP-A-2014-81068)

As an eccentric oscillation type gear device, a gear device provided with a cross roller bearing between an output member and a casing to thereby receive loads in a thrust direction and a radial direction is also proposed (see PTL 2: JP-A-2017-44319).

SUMMARY OF INVENTION

Technical Problem

In the speed reducer according to PTL 1, the output member is rotatably supported with respect to the housing only by the single bearing, therefore, whirling of the output member occurs around the input shaft. Specifically, the external gear revolves around the input shaft while rotating with the external gear meshing with the internal gear, and the output pins connected to the output member also rotate with the gears. At this time, moments act around an axis of the bearing in accordance with a distance in an axial direction from the center line in the radial direction of bearing to end portions of the output pins. Accordingly, an end surface of the output member whirls and it is difficult to support the moments by a ball bearing.

When the cross roller bearing disclosed in PTL 2 is provided as the bearing instead of the ball bearing, manufacturing costs will be high. Moreover, loads acting on output pins differ in an output pin contact portion of the external gear close to the output member and in an output pin contact portion of the external gear apart from the output member. Accordingly, deflection occurs due to the rigidity of the output pins connecting to the output member, therefore, deviation occurs in loads and moments occur in accordance with a distance in the axial direction from the bearing to two pieces of external gears. Accordingly, whirling may occur in the output member and precession may occur in the output pins. As a result, the bearing is easily damaged and a lifetime is reduced.

Solution to Problem

The present invention has been accomplished under the above problems, and an object thereof is to provide an inexpensive and thin speed reducer capable of realizing a long lifetime of bearings by reducing the effect of internal moments acting on the output member without using expensive bearings and a motor using the speed reducer which is small in size and has high durability.

The present invention includes the following structures for achieving the above object.

A speed reducer performing output with a gear mechanism rotating to reduce speed around an eccentric shaft driven to rotate by a drive source includes the eccentric shaft driven and transmitted by the drive source, an internal gear provided around an inner peripheral surface of a speed reducer housing, a plurality of external gears eccentrically assembled to the eccentric shaft and revolving around the eccentric shaft by meshing with the internal gear, through holes piercing in an axial direction provided on the plural external gears, output pins piercing while externally contacting the through holes, provided at plural positions in a circumferential direction along the eccentric shaft, an output member to which end portions of the output pins are connected and rotating to reduce speed with the revolution of the plural external gears through an outer bearing provided in the speed reducer housing, in which the plural external gears are respectively assembled to the eccentric shaft at positions where moments obtained by multiplying distances in the axial direction from the position of a bearing center line of the outer bearing provided in the speed reducer housing to the center positions of the respective external gears by magnitudes of loads acting on the output pins at the positions are cancelled out with one another.

Accordingly, the plural external gears are respectively assembled to the eccentric shaft so that moments obtained by multiplying distances in the axial direction from the position of the bearing center line of the outer bearing provided in the speed reducer housing to the center positions of the respective external gears by magnitudes of loads acting on the output pins at the positions are cancelled out with one another, therefore, runouts such as precession do not occur even when the output member is supported by only the outer bearing provided in the speed reducer housing, which contributes to reduction in size and thickness of the motor with the speed reducer, and costs can be reduced and the lifetime can be elongated by using an inexpensive ball bearing, and further, an expensive cross roller bearing is not necessary.

The first external gear and the second external gear may assembled to the output member in the axial direction in this order, and when a distance in the axial direction from the bearing center line of the outer bearing to a first external gear center line is "a", a distance in the axial direction to a second external gear center line is "b", loads acting on the first output pin and the second output pin externally contacting the through holes of the first external gear and the second external gear respectively in the distances in the axial direction "a", "b" are fa, fb, thicknesses of the first and second external gear are ta, tb, and a distance in the axial direction between the first external gear and the second external gear is "h", the distances in the axial direction "a", "b", the thicknesses of the external gears "ta", "tb" and the distance in the axial direction "h" may be adjusted so as to satisfy all the following (formula 1) to (formula 3):

$$|fa*a-fb*b| \approx 0 \text{ [Nm]} \quad \text{(formula 1)}$$

$$(b-tb/2)-(a+ta/2)=h \quad \text{(formula 2)}$$

$$|(fa-fb)*a-fb*(h+ta/2+tb/2)| \approx 0 \text{ [Nm]} \quad \text{(formula 3)}.$$

Accordingly, internal moments generated in the first external gear and the second external gear rotating around the eccentric shaft can be reduced, therefore, loads on the bearings provided in the speed reducer housing supporting the output member are reduced, which can elongate the lifetime.

The first external gear and the second external gear may be assembled to the output member in the axial direction in this order, and when a distance in the axial direction from the bearing center line of the outer bearing to a first external gear center line is "a", a distance in the axial direction to a second external gear center line is "b", thicknesses of the first and second external gear are ta, tb, a distance in the axial direction between the first external gear and the second external gear is "h", and a torque generated in the first external gear is Ta, a torque generated in the second external gear is Tb and pitch radiuses of the first output pin and second output pin externally contacting the through holes of the first external gear and the second external gear respectively from the center of the eccentric shaft are ra, rb, the pitch radiuses ra, rb may be adjusted so as to satisfy the following formula:

$$|(Ta/ra-Tb/rb)*a-(Tb/rb)*(h+ta/2+tb/2)| \approx 0 \text{ [Nm]} \quad \text{(formula 4)}.$$

According to the above, the internal moments generated in the external gears can be reduced without reducing the rigidity of the first and second output pins more than necessary.

The first external gear, the second external gear and a third external gear may be assembled to the output member in the axial direction in this order, and when a distance in the axial direction from the bearing center line of the outer bearing to a first external gear center line is "a", a distance in the axial direction to a second external gear center line is "b", a distance in the axial direction to a third external gear center line is "c", loads acting on the first output pin, the second output pin and the third output pin externally contacting the through holes of the first external gear, the second external gear and the third external gear respectively in the distances in the axial direction "a", "b" and "c" are fa, fb, and fc, thicknesses of the first, second and third external gears are ta, tb and tc, a distance in the axial direction between the first external gear and the second external gear is hab, and a distance in the axial direction between the second external gear and the third external gear is hbc, the following formulas may hold:

$$|a*fa-(a+ta/2+hab+tb/2)*fb/2-(a+ta/2+hab+tb+hbc+tc/2)*fc/2| \approx 0 \quad \text{(formula 5)},$$

$$|(a+ta/2+hab+tb/2)*3^{1/2}/2*fb-(a+ta/2+hab+tb+hbc+tc/2)*3^{1/2}/2*fc| \approx 0 \quad \text{(formula 6)}.$$

According to the above, internal moments generated in the first external gear, the second external gear, and the third external gear rotating around the eccentric shaft can be reduced, therefore, loads on the bearings provided in the speed reducer housing supporting the output member are reduced, which can elongate the lifetime.

The first external gear, the second external gear and a third external gear may be assembled to the output member in the axial direction in this order, and when a distance in the axial direction from the bearing center line of the outer bearing to a first external gear center line is "a", a distance in the axial direction to a second external gear center line is "b", a distance in the axial direction to a third external gear center line is "c", loads acting on the first output pin, the second output pin and the third output pin externally contacting the through holes of the first external gear, the second external gear and the third external gear respectively in the distances in the axial direction "a", "b" and "c" are fa, fb, and fc, thicknesses of the first, second and third external gears are ta, tb and tc, a distance in the axial direction between the first external gear and the second external gear is hab, a distance in the axial direction between the second external gear and the third external gear is hbc, a torque generated in the first external gear is Ta, a torque generated in the second external gear is Tb and a torque generated in the third external gear is Tc, pitch radiuses of the first output pin, the second output pin and the third output pin from the center of the eccentric shaft are ra, rb, rc, the pitch radiuses ra, rb, rc may be adjusted so as to satisfy the following formulas:

$$|a*Ta/ra-(a+ta/2+hab+tb/2)*Tb/rb/2-(a+ta/2+hab+tb+hbc+tc/2)*Tc/rc/2| \approx 0 \quad \text{(formula 7)}$$

$$|(a+ta/2+hab+tb/2)*3^{1/2}/2*Tb/rb-(a+ta/2+hab+tb+hbc+tc/2)*3^{1/2}/2*Tc/rc/2| \approx 0 \quad \text{(formula 8)}.$$

According to the above, the internal moments generated in the external gears can be reduced without reducing the rigidity of the first to third output pins more than necessary.

A motor with a speed reducer includes an electric motor in which a motor shaft is connected to an eccentric shaft of any one of above described speed reducer.

According to the above, a small-sized motor with a speed reducer having high durability can be provided.

Advantageous Effects of Invention

An inexpensive and thin speed reducer capable of elongating lifetime of bearings by reducing the effect of internal moments acting on the output member without using expensive bearings can be provided.

Moreover, a small-sized motor with a speed reducer having high durability can be provided by including an electric motor in which a motor shaft is connected to an eccentric shaft of the speed reducer.

DESCRIPTION OF EMBODIMENTS

Hereinafter, an embodiment of a speed reducer and a motor with the speed reducer according to the present invention will be explained with reference to the attached drawings. First, a schematic structure of the motor with the speed reducer will be explained with reference to FIGS. 1 and 2. A DC brushless motor is used as the motor, and an inner-rotor type motor is used in the embodiment.

Figure 1:
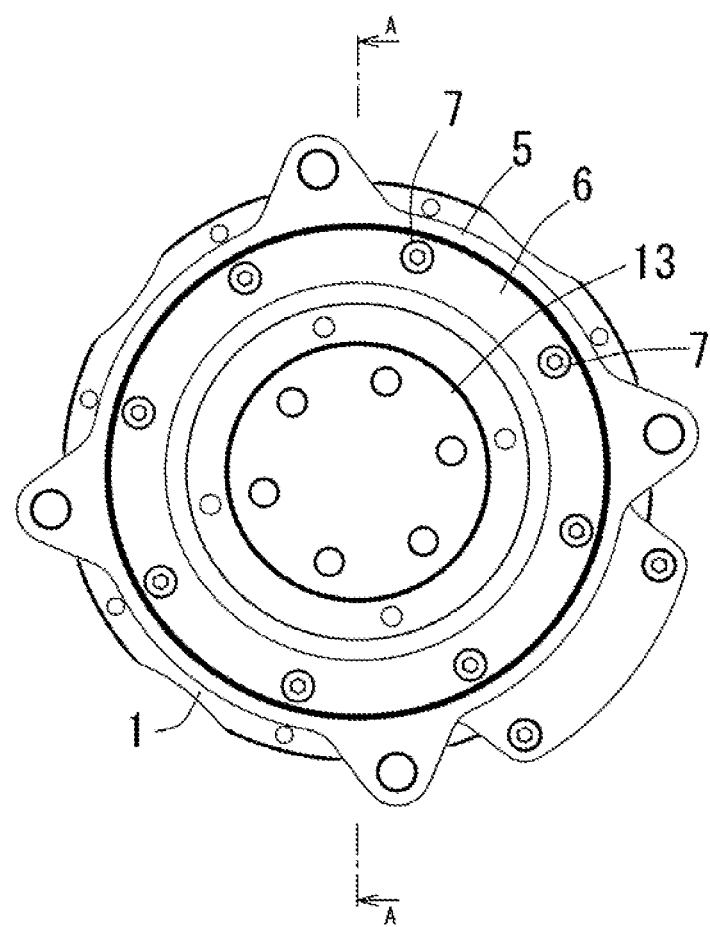
FIG. 1 is a plan view of a motor with a speed reducer.
Figure 2:
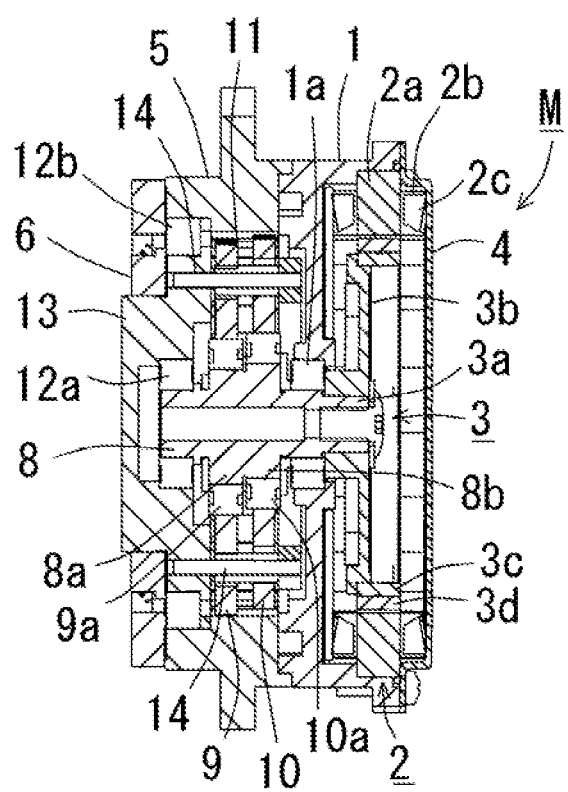
FIG. 2 is a cross-sectional view taken along arrows A-A of FIG. 1.

As shown in FIGS. 1 and 2, an electric motor M is housed in a motor housing 1. In the electric motor M, a stator 2 is assembled to the motor housing 1 and a rotor 3 is assembled in a space surrounded by the stator 2. In the stator 2, a coil 2c is wound around the stator core 2a through an insulator 2b.

The rotor 3 is configured by integrally assembling a rotor hub 3b at a shaft end of a rotor shaft 3a. A ring-shaped back yoke 3c is integrally assembled along an axial direction at an outer peripheral edge of the rotor hub 3b. A rotor magnet 3d is integrally assembled to an outer peripheral surface of the back yoke 3c. In the rotor magnet 3d, N-poles and S-poles are alternately magnetized in a circumferential direction and the rotor magnet 3d is arranged so as to face pole teeth of the stator core 2a. The rotor core 3a is pivotally supported with respect to the motor housing 1 so as to rotate by a motor bearing 1a. The electric motor M is housed in a storage space formed by arranging a motor cover 4 so as to overlap the motor housing 1.

A speed reducer housing 5 is arranged to overlap the motor housing 1 and a fixing member 6 is arranged to overlap an end surface of the speed reducer housing 5, then, these members are fitted to the motor housing 1 by screws by inserting screws 7 (see FIG. 1) at plural positions from the fixing member 6 side in the circumferential direction to be integrally assembled.

An eccentric shaft 8 is assembled to the speed reducer housing 5 concentrically with the rotor shaft 3a. The eccentric shaft 8 is rotatably driven together with the rotor shaft 3a by the electric motor M. The eccentric shaft 8 may be connected to the rotor shaft 3a by coupling and the like.

In the central portion of the eccentric shaft 8, first and second eccentric cam portions 8a, 8b are formed side by side from an output side. The first and second eccentric cam portions 8a, 8b have the same eccentricity with respect to the shaft center of the eccentric shaft 8 and have phases shifted with each other by approximately 180 degrees. A first external gear 9 is assembled to an outer periphery of the first eccentric cam portion 8a so as to rotate freely through a first bearing 9a. A second external gear 10 is assembled to the second eccentric cam portion 8b so as to rotate freely through a second bearing 10a. An internal gear 11 is provided on an inner peripheral surface of the speed reducer housing 5. Parts of the first external gear 9 and the second external gear 10 on the outer peripheral side are respectively meshes with the internal gear 11. The rotation centers correspond to a center line of the internal gear 11 provided on the inner peripheral surface of the speed reducer housing 5, and a tooth profile of the internal gear 11, the first external gear 9 and the second external gear 10 is a trochoidal tooth profile.

An output member 13 is rotatably supported at an output end of the eccentric shaft 8 through an internal bearing 12a. An outer peripheral side of the output member 13 is rotatably supported between the output member 13 and the speed reducer housing 5 through an outer bearing 12b. These are fixed by screws 7 in the axial direction so as not to slip off by setting the fixing member 6 to overlap the output member 13.

Figure 3A:
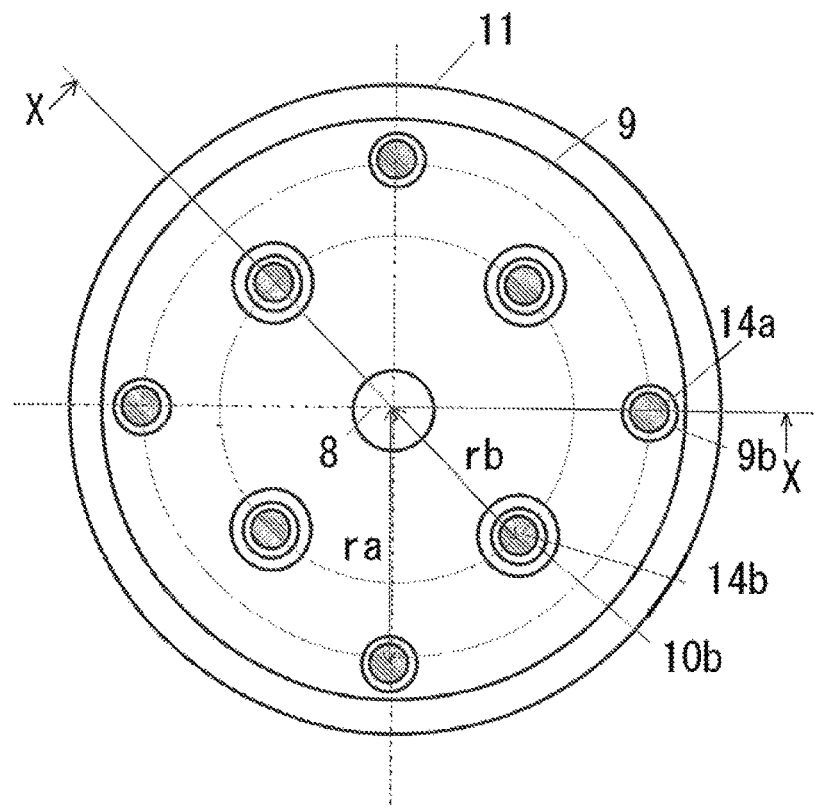
FIG. 3A is a plan view in an axial direction of a speed reducer.
Figure 3B:
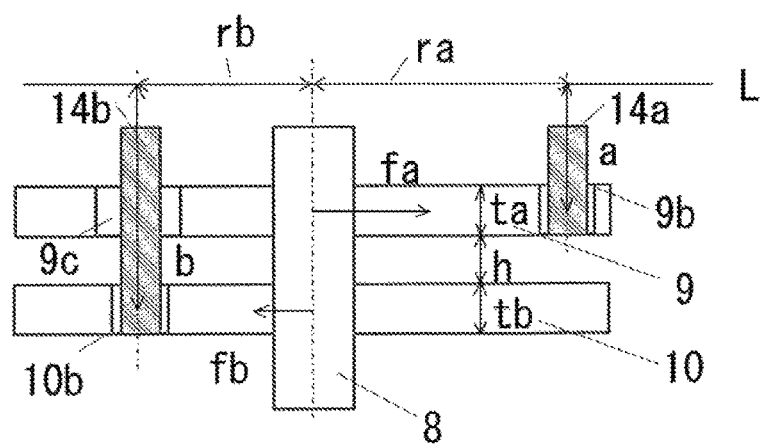
FIG. 3B is a schematic cross-sectional view taken along arrows X-X.

As shown in FIGS. 3A and 3B, first output pins 14a and second output pins 14b are formed to stand in the output member 13 (see FIG. 4A) from an outer side in a radial direction toward an inner side in the radial direction. As shown in FIG. 3B, the first external gear 9 and the second external gear 10 are assembled in the axial direction around the eccentric shaft 8 so as to face the output member 13. In the output member 13 (see FIG. 4A), the first output pins 14a are held in the outer side in the radial direction and the second output pins 14b are held in the inner side in the radial direction at plural positions (four positions) respectively in the circumferential direction so that phases are shifted by 45 degrees. The second output pins 14b and the first output pins 14a may be formed to stand in this order in the output member 13 from the outer side in the radial direction toward the inner side in the radial direction.

Figures 4A, 4B:
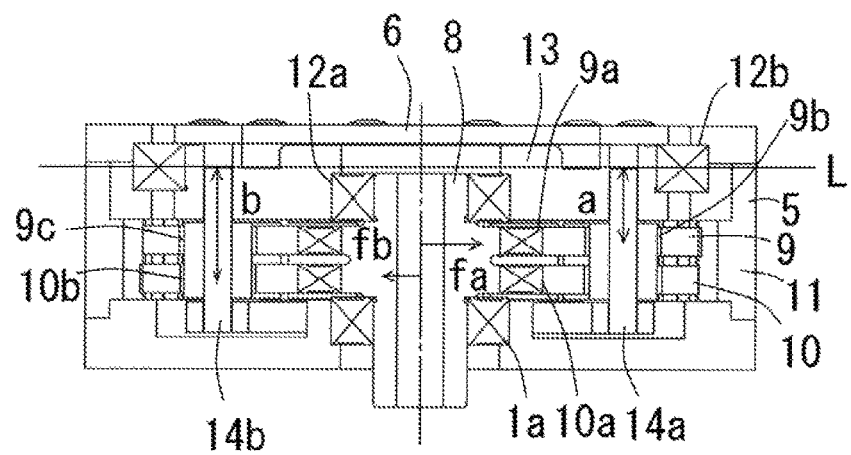
FIG. 4A a cross-sectional explanatory view of internal moments acting on first and second external gears of the speed reducer of FIGS. 3A and 3B.
FIG. 4B is a chart showing examples of moments acting on the first and second external gears.

As shown in FIG. 4A, the first output pins 14a and the second output pins 14b are respectively supported by the output member 13. Specifically, in the first output pins 14a and the second output pins 14b, one end sides are assembled to stand on the output member 13 so that the pins are parallel to the eccentric shaft 8, and the other end sides externally contact first through holes 9b provided in the first external gear 9 and second through holes 10b provided in the second external gear 10 respectively (see FIG. 3B). In FIG. 3B, the other end of the first output pin 14a is inserted into and externally contacts the first through hole 9b of the first external gear 9. In the first external gear 9 facing the second through holes 10b provided in the second external gear 10 in the axial direction, a refuge hole 9c having a larger hole diameter than that of the second through hole 10b is drilled. The other end of the second output pin 14b is inserted into and externally contacts the second through hole 10b provided in the second external gear 10 through the refuge hole 9c without interfering with the first external gear 9. When the eccentric shaft 8 rotates, the first external gear 9 and the second external gear 10 revolve around the eccentric shaft 8 while meshing with the internal gear 11.

Along with the revolution of the first and second external gears 9, 10, the output member 13 rotates with reduced speed through the outer bearing 12b provided in the speed reducer housing 5. The first and second external gears 9, 10 are respectively assembled to the eccentric shaft 8 at positions where moments calculated by multiplying distances from the position of a bearing center line L of the outer bearing 12b provided in the speed reducer housing 5 in the axial direction by loads acting on the first and second output pins 14a, 14b at the positions are cancelled out with each other. Although two external gears are used, the present invention is not always limited to this and three or more external gears may be used as described later.

According to the above, plural external gears 9, 10 are respectively assembled to the eccentric shaft 8 so that the moments obtained by multiplying distances from the position of the bearing center line L of the outer bearing 12b provided in the speed reducer housing 5 in the axial direction by loads acting on the first and second output pins 14a, 14b at the positions are cancelled out with each other, therefore, even when the output member 13 is supported by only the outer bearing 12b provided in the speed reducer housing 5, runouts such as precession do not occur, which contributes to reduction in size and thickness of the motor with the speed reducer, and the inexpensive ball bearing can be used and the expensive cross roller bearing is not necessary.

Here, internal moments generated in the first external gear 9 and the second external gear 10 of the speed reducer will be specifically described with reference to FIGS. 4A and 4B.

As shown in FIG. 4A, the first external gear 9 and the second external gear 10 are assembled to the output member 13 in this order in the axial direction. When a distance in the axial direction from the bearing center line L of the outer bearing 12b to a center line of the first external gear 9 is "a", a distance in the axial direction to a center line of the second external gear 10 is "b", loads respectively acting on the first and second pins 14a, 14b externally contacting the first and second through holes 9b, 10b of the first external gear 9 and the second external gear 10 respectively in the distances "a", "b" in the axial direction are "fa", "fb", and thicknesses of the first external gear 9 and the second external gear 10 are "ta", "tb", and a distance in the axial direction between the first external gear 9 and the second external gear 10 is "h", the distances in the axial direction "a", "b", the thicknesses of the gears are "ta", "tb" and the distance in the axial direction "h" are adjusted so as to satisfy the following (formula 1) to (formula 3):

$$|fa*a-fb*b| \approx 0 \text{ [Nm]} \quad \text{(formula 1)}$$

$$(b-tb/2)-(a+ta/2)=h \quad \text{(formula 2)}$$

$$|(fa-fb)*a-fb*(h+ta/2+tb/2)| \approx 0 \text{ [Nm]} \quad \text{(formula 3)}.$$

Accordingly, the internal moments generated in the first external gear 9 and the second external gear 10 rotating around the eccentric shaft 8 can be reduced, therefore, the load on the outer bearing 12b supporting the output member 13 is reduced, which can elongate the lifetime. A chart shown in FIG. 4B indicates an example in which loads are borne by the first external gear 9 and the second external gear 10 at the ratio of 6:4 or 7:3 due to deflection or distortion of the first and second output pins 14a, 14b.

Supposing that the first and second output pins 14a, 14b have the same material and the same diameter, a deflection amount to the first external gear 9 (first through hole 9b) externally contacted by the first output pin 14a, a distance of which from the bearing center line L of the outer bearing 12b is shorter, is smaller than a deflection amount to the second external gear 10 (second through hole 10b) externally contacted by the second output pin 14b, which is basically a relationship of fa>fb (a longer bar easily deflects as compared with a shorter bar).

Accordingly, when considering cancellation of the internal moments generated in the first external gear 9 and the second external gear 10, the load fa acting on the first output pin 14a is arranged on an outer diameter side (FIG. 3B: ra) and the load fb acting on the second output pin 14b is arranged in an inner diameter side (FIG. 3B: rb), thereby performing design corresponding to the loads.

Moreover, when a torque generated in the first external gear 9 is Ta, a torque generated in the second external gear 10 is Tb and pitch radiuses of the first and second output pins 14a, 14b externally contacting the first and second through holes 9b, 10b of the first external gear 9 and the second external gear 10 respectively from the center of the eccentric shaft 8 are "ra", "rb", the pitch radiuses "ra", "rb" may be adjusted so as to satisfy the following formula:

$$|(Ta/ra-Tb/rb)*a-(Tb/rb)*(h+ta/2+tb/2)| \approx 0 \text{ [Nm]} \quad \text{(formula 4)}.$$

According to above, the internal moments generated in the plural external gears can be reduced without reducing the rigidity of the output pins more than necessary. Particularly in the case where the loads fa, fb respectively acting on the first and second output pins 14a, 14b have the relationship of fa>fb, when the pitch radiuses ra, rb of the first external gear 9 and the second external gear 10 from the center of the eccentric shaft 8 is ra>rb, the speed reducer can be configured without requiring the rigidity of respective gears more than necessary.

The pitch radiuses ra, rb are changed to be different in the first external gear 9 and the second external gear 10, thereby cancelling out the internal moments generated in the first external gear 9 and the second external gear 10 rotating around the eccentric shaft 8.

The first output pins 14a and the second output pins 14b may have a structure in which one ends are cantilevered by the output member 13 as well as a structure in which both ends are held by providing members to be paired with the output member 13.

Figure 5A:
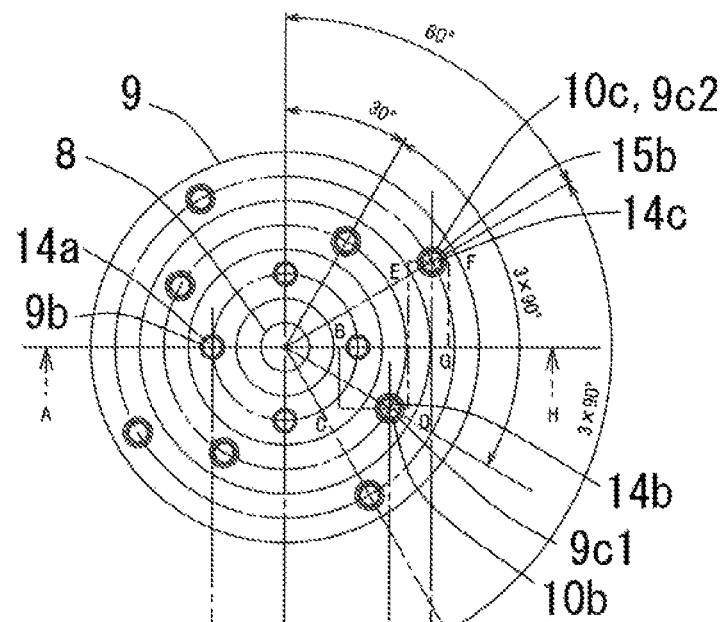
FIG. 5A is a plan view in the axial direction of a speed reducer according to another example.
Figure 5B:
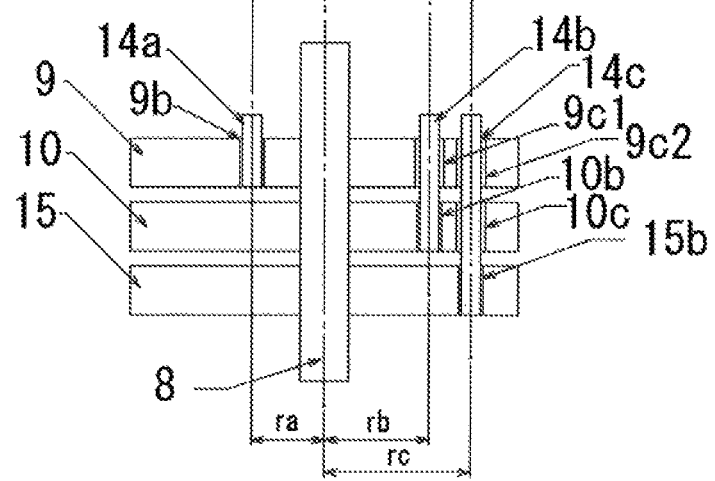
FIG. 5B is a schematic cross-sectional view taken along arrows A, B, C, D, E, F, G and H.
Figure 6:
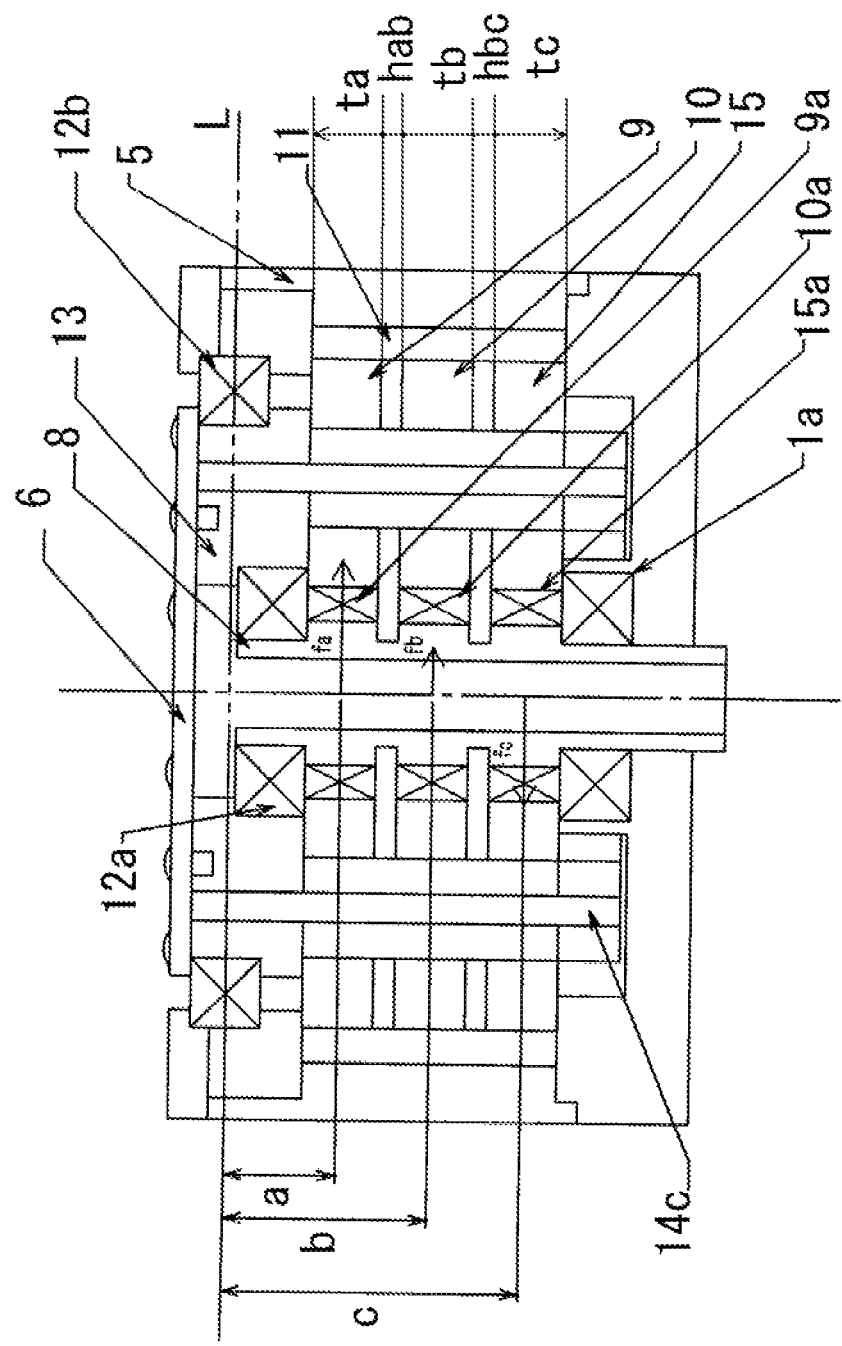
FIG. 6 is a cross-sectional explanatory view of internal moments acting on external gears of the speed reducer of FIGS. 5A and 5B.

Another structure of the speed reducer with two external gears shown in FIGS. 3A, 3B and FIGS. 4A, 4B are shown in FIGS. 5A, 5B and FIG. 6. As shown in FIG. 5A, the first external gear 9, the second external gear 10 and a third external gear 15 are assembled in the axial direction around the eccentric shaft 8 so as to face the output member 13 (see FIG. 6). As shown in FIG. 6, the first external gear 9, the second external gear 10 and the third external gear 15 are rotatably assembled around the eccentric shaft 8 through the first bearing 9a, the second bearing 10a and a third bearing 15a. As shown in FIG. 5A, first output pins 14a, second output pins 14b and third output pins 14c are formed to stand on the output member 13 (see FIG. 6) from an inner side in the radial direction to an outer side in the radial direction. As shown in FIG. 5B, the first external gear 9, the second external gear 10 and the third external gear 15 are assembled around the eccentric shaft 8 in parallel to the output member 13. In the output member 13 (see FIG. 6), the first output pins 14a, the second output pins 14b and the third output pins 14c are held from the inner side in the radial direction to the outer side in the radial direction so that phases are shifted by 30 degrees at plural positions (four positions) in the circumferential direction, respectively.

As shown in FIG. 6, the first output pins 14a and the second output pins 14b are respectively supported by the output member 13. Specifically, the first output pins 14a, the second output pins 14b and the third output pins 14c are assembled so that one ends stand on the output member 13 in parallel to the eccentric shaft 8, and the other ends externally contact the first through holes 9b provided in the first external gear 9, the second through holes 10b provided in the second external gear 10 and third through holes 15b provided in the third external gears 15, respectively (see FIG. 5B). In FIG. 5B, the other end of the first output pin 14a is inserted into and externally contacts the first through hole 9b of the first external gear 9. In the first external gear 9 facing the second through hole 10b provided in the second external gear 10 in the axial direction, a first refuge hole 9c1 having a larger diameter than that of the second through hole 10b is drilled. In the second external gear 10 facing the third through hole 15b provided in the third external gear 15 in the axial direction, a refuge hole 10c having a larger diameter than that of the third through hole 15b is drilled, and in the first external gear 9 facing the refuge hole 10c, a second refuge hole 9c2 is drilled. The other end of the second output pin 14b pierces through the first refuge hole 9c1, being inserted into and externally contacts the second through hole 10b provided in the second external gear 10 without interfering with the first external gear 9. The other end of the third output pin 14c pierces through the second refuge hole 9c2 and the refuge hole 10c, being inserted into and externally contacts the third through hole 15b provided in the third external gear 15 without interfering with the first external gear 9 and the second external gear 10. When the eccentric shaft 8 rotates, the first external gear 9, the second external gear 10 and the third external gear 15 revolve around the eccentric shaft 8 while meshing with the internal gear 11.

Here, the internal moments generated in the first external gear 9, the second external gear 10 and the third external gear 15 of the speed reducer will be specifically described with reference to FIG. 6.

As shown in FIG. 6, the first external gear 9, the second external gear 10 and the third external gear 15 are assembled in this order in the axial direction of the eccentric shaft 8 so as to face the output member 13. In this case, when a distance in the axial direction from the bearing center line L in the axial direction of the outer bearing 12b to the center line of the first external gear 9 is "a", a distance in the axial direction to the center line of the second external gear 10 is "b", a distance in the axial direction to a center line of the third external gear 15 is "c", loads acting on the first output pins 14a, the second output pins 14b and the third output pins 14c in the distances in the axial direction "a", "b" and "c" are fa, fb, and fc, thicknesses of the first, second and third external gears are "ta", "tb" and "tc", a distance in the axial direction between the first external gear 9 and the second external gear 10 is hab, and a distance in the axial direction between the second external gear 10 and the third external gear 15 is hbc, pitch radiuses ra, rb and rc may be adjusted so as to satisfy the following formulas:

$|a*fa-(a+ta/2+hab+tb/2)*fb/2-(a+ta/2+hab+tb+hbc+tc/2)*fc/2| \approx 0$ (formula 5), $|(a+ta/2+hab+tb/2)*3^{1/2}/2*fb-(a+ta/2+hab+tb+hbc+tc/2)*3^{1/2}/2*fc| \approx 0$ (formula 6).

According to the above, the internal moments generated in the first to third external gears 9, 10 and 15 can be reduced without reducing the rigidity of the first to third output pins 14a to 14c more than necessary.

In this case, when a torque generated in the first external gear 9 is Ta, a torque generated in the second external gear 10 is Tb and a torque generated in the third external gear 15 is Tc, and pitch radiuses of the first to third output pins 14a to 14c are ra, rb and rc, the pitch radiuses ra, rb and rc may be adjusted so as to satisfy the following formulas:

$|a*Ta/ra-(a+ta/2+hab+tb/2)*Tb/rb/2-(a+ta/2+hab+tb+hbc+tc/2)*Tc/rc/2| \approx 0$ (formula 7), $|(a+ta/2+hab+tb/2)*3^{1/2}/2*Tb/rb-(a+ta/2+hab+tb+hbc+tc/2)*3^{1/2}/2*Tc/rc/2| \approx 0$ (formula 8).

The embodiment has been explained by using the inner-rotor type motor as the electric motor M, however, an outer-rotor type motor may be used. Furthermore, other types of motors such as a brush motor and an ultrasonic motor as well as other types of drive sources may be used in addition to the brushless motors.

What is claimed is:

1. A speed reducer performing output with a gear mechanism rotating to reduce speed around an eccentric shaft driven to rotate by a drive source comprising:
   the eccentric shaft driven and transmitted by a drive source;
   an internal gear provided around an inner peripheral surface of a speed reducer housing;
   a plurality of external gears eccentrically assembled to the eccentric shaft and revolving around the eccentric shaft by meshing with the internal gear;
   through holes piercing in an axial direction provided on the plural external gears;
   output pins piercing while externally contacting the through holes, provided at plural positions in a circumferential direction along the eccentric shaft;
   an output member to which end portions of the output pins are connected and rotating to reduce speed with the revolution of the plural external gears through an outer bearing provided in the speed reducer housing,
   wherein the plural external gears are respectively assembled to the eccentric shaft at positions where moments obtained by multiplying distances "a", "b", and "c" in the axial direction from the position of a bearing center line L of the outer bearing provided in the speed reducer housing to the center positions of the respective external gears by magnitudes of loads fa, fb and fc acting on the output pins at the positions are cancelled out with one another.

2. The speed reducer according to claim 1, wherein the first external gear and the second external gear are assembled to the output member in the axial direction in this order, and
   when a distance in the axial direction from the bearing center line L of the outer bearing to a first external gear center line is "a", a distance in the axial direction to a second external gear center line is "b", loads acting on the first output pin and the second output pin externally contacting the through holes, of the first external gear and the second external gear respectively in the distances in the axial direction "a", "b" are fa, fb, thicknesses of the first and second external gear are ta, tb, and a distance in the axial direction between the first external gear and the second external gear is "h", the distances in the axial direction "a", "b", the thicknesses of the external gears "ta", "tb" and the distance in the axial direction "h" are adjusted so as to satisfy all the following (formula 1) to (formula 3):

$$|fa*a - fb*b| \approx 0 \text{ [Nm]} \qquad \text{(formula 1)}$$

$$(b - tb/2) - (a + ta/2) = h \qquad \text{(formula 2)}$$

$$|(fa - fb)*a - fb*(h + ta/2 + tb/2)| \approx 0 \text{ [Nm]} \qquad \text{(formula 3)}.$$

3. The speed reducer according to claim 1, wherein the first external gear and the second external gear are assembled to the output member in the axial direction in this order, and when a distance in the axial direction from the bearing center line L of the outer bearing to a first external gear center line is "a", a distance in the axial direction to a second external gear center line is "b", thicknesses of the first and second external gear are ta, tb, a distance in the axial direction between the first external gear and the second external gear is "h", and a torque generated in the first external gear is Ta, a torque generated in the second external gear is Tb and pitch radiuses of the first output pin and second output pin externally contacting the through holes of the first external gear and the second external gear respectively from the center of the eccentric shaft are ra, rb, the pitch radiuses ra, rb are adjusted so as to satisfy the following formula:

$$|(Ta/ra - Tb/rb)*a - (Tb/rb)*(h + ta/2 + tb/2)| \approx 0 \text{ [Nm]} \qquad \text{(formula 4)}.$$

4. The speed reducer according to claim 1, wherein the first external gear, the second external gear and a third external gear are assembled to the output member in the axial direction in this order, and when a distance in the axial direction from the bearing center line L of the outer bearing to a first external gear center line is "a", a distance in the axial direction to a second external gear center line is "b", a distance in the axial direction to a third external gear center line is "c", loads acting on the first output pin, the second output pin and the third output pin externally contacting the through holes of the first external gear, the second external gear and the third external gear respectively in the distances in the axial direction "a", "b" and "c", are fa, fb, and fc, thicknesses of the first, second and third external gears are ta, tb and tc, a distance in the axial direction between the first external gear and the second external gear is hab, and a distance in the axial direction between the second external gear and the third external gear is hbc, the following formulas hold:

$$|a*fa - (a + ta/2 + hab + tb/2)*fb/2 - (a + ta/2 + hab + tb + hbc + tc/2)*fc/2| \approx 0 \qquad \text{(formula 5)}$$

$$|(a + ta/2 + hab + tb/2)*3^{1/2}/2*fb - (a + ta/2 + hab + tb + hbc + tc/2)*3^{1/2}/2*fc| \approx 0 \qquad \text{(formula 6)}.$$

5. The speed reducer according to claim 1, wherein the first external gear, the second external gear and a third external gear are assembled to the output member in the axial direction in this order, and when a distance in the axial direction from the bearing center line L of the outer bearing to a first external gear center line is "a", a distance in the axial direction to a second external gear center line is "b", a distance in the axial direction to a third external gear center line is "c", loads acting on the first output pin, the second output pin and the third output pin externally contacting the through holes of the first external gear, the second external gear and the third external gear respectively in the distances in the axial direction "a", "b" and "c" are fa, fb, and fc, thicknesses of the first, second and third external gears are ta, tb and tc, a distance in the axial direction between the first external gear and the second external gear is hab, a distance in the axial direction between the second external gear and the third external gear is hbc, a torque generated in the first external gear is Ta, a torque generated in the second external gear is Tb and a torque generated in the third external gear is Tc, pitch radiuses of the first output pin, the second output pin and the third output pin from the center of the eccentric shaft are ra, rb, rc, the pitch radiuses ra, rb, rc may be adjusted so as to satisfy the following formulas:

$$|a*Ta/ra - (a + ta/2 + hab + tb/2)*Tb/rb/2 - (a + ta/2 + hab + tb + hbc + tc/2)*Tc/rc/2| \approx 0 \qquad \text{(formula 7)}$$

$$|(a + ta/2 + hab + tb/2)*3^{1/2}/2*Tb/rb - (a + ta/2 + hab + tb + hbc + tc/2)*3^{1/2}/2*Tc/rc| \approx 0 \qquad \text{(formula 8)}.$$

6. A motor with a speed reducer comprising:
an electric motor in which a motor shaft is connected to an eccentric shaft of a speed reducer according to claim 1.

* * * * *